United States Patent
Kester

(10) Patent No.: US 10,327,372 B2
(45) Date of Patent: Jun. 25, 2019

(54) MOUNTING STRUCTURE FOR MOUNTING GAUGE WHEEL ASSEMBLY TO IMPLEMENT

(71) Applicant: Philip C. Kester, East Moline, IL (US)

(72) Inventor: Philip C. Kester, East Moline, IL (US)

(73) Assignee: Copperhead Planter Products, LLC, Humboldt, SD (US)

( * ) Notice: Subject to any disclaimer, the term of this patent is extended or adjusted under 35 U.S.C. 154(b) by 150 days.

(21) Appl. No.: 15/369,728

(22) Filed: Dec. 5, 2016

(65) Prior Publication Data

US 2017/0156253 A1   Jun. 8, 2017

Related U.S. Application Data

(60) Provisional application No. 62/263,528, filed on Dec. 4, 2015.

(51) Int. Cl.
| | |
|---|---|
| A01B 63/16 | (2006.01) |
| A01C 7/20 | (2006.01) |
| A01B 49/06 | (2006.01) |
| A01B 35/16 | (2006.01) |
| A01B 63/00 | (2006.01) |
| A01C 5/06 | (2006.01) |
| A01C 7/04 | (2006.01) |

(52) U.S. Cl.
CPC ............ *A01B 49/06* (2013.01); *A01B 35/16* (2013.01); *A01B 63/008* (2013.01); *A01C 5/068* (2013.01); *A01C 7/203* (2013.01); *A01C 5/064* (2013.01); *A01C 7/04* (2013.01)

(58) Field of Classification Search
CPC ....... A01B 49/06; A01B 35/16; A01B 63/008; A01C 5/068; A01C 7/203; A01C 7/04; A01C 5/064
See application file for complete search history.

(56) References Cited

U.S. PATENT DOCUMENTS

| | | |
|---|---|---|
| 5,427,038 A | 6/1995 | Ege |
| 5,904,107 A | 5/1999 | Kester |

(Continued)

OTHER PUBLICATIONS

RK Products Inc., Instruction Sheet No. AI-1240, Nov. 23, 2011.

(Continued)

*Primary Examiner* — Tara Mayo-Pinnock
(74) *Attorney, Agent, or Firm* — Jeffrey L. Thompson; Thompson & Thompson, P.A.

(57) ABSTRACT

A mounting structure for mounting a pivot arm to an implement has a cylindrical member, an adjusting sleeve, and a mounting bolt extending through the cylindrical member and adjusting sleeve to fix the cylindrical member and adjusting sleeve together. The cylindrical member extends through a bore of a bearing housing for rotation within the bearing housing. The adjusting sleeve has a threaded external surface. A disc spring is positioned on the adjusting sleeve. An adjusting nut is threaded onto the threaded external surface of the adjusting sleeve. The adjusting nut can be tightened to compress the disc spring to create a lateral bearing force against the bearing housing. The bearing housing can be integral with a pivot arm for mounting a gauge wheel assembly on a planter row unit, or the bearing housing can be a fixed part for mounting a pivot arm for a closing/press wheel on a drill.

22 Claims, 6 Drawing Sheets

(56) References Cited

U.S. PATENT DOCUMENTS

| | | | |
|---|---|---|---|
| 8,387,715 B2 | 3/2013 | Rylander | |
| 8,616,298 B2 | 12/2013 | Rylander | |
| 2003/0209175 A1* | 11/2003 | Kester | A01B 63/163 |
| | | | 111/52 |
| 2005/0072344 A1* | 4/2005 | Kester | A01B 71/04 |
| | | | 111/135 |
| 2010/0229770 A1* | 9/2010 | Hagny | A01C 5/064 |
| | | | 111/163 |
| 2011/0162565 A1* | 7/2011 | Rylander | A01B 71/04 |
| | | | 111/200 |
| 2012/0145057 A1* | 6/2012 | Hagny | A01C 5/064 |
| | | | 111/163 |

OTHER PUBLICATIONS

RK Products Inc., Instruction Sheet No. AI-1242, Feb. 13, 2013.
RK Products Inc., Instruction Sheet No. AI-1250, Mar. 6, 2015.
RK Products Inc., Instruction Sheet No. AI-1251, Dec. 11, 2015.
RK Products Inc., Instruction Sheet No. AI-1255, Feb. 15, 2012.
RK Products Inc., Instruction Sheet No. AI-1282, Jul. 11, 2012.

* cited by examiner

MOUNTING STRUCTURE FOR MOUNTING GAUGE WHEEL ASSEMBLY TO IMPLEMENT

RELATED APPLICATION

This application claims the priority benefit of U.S. Provisional Patent Application No. 62/263,528 filed on Dec. 4, 2015, the content of which is incorporated herein by reference.

BACKGROUND OF THE INVENTION

Field of the Invention

The present invention relates generally to seed planting implements, and in particular, to an improved mounting structure for mounting gauge wheel arms and closing wheel arms to a seed planting implement.

Description of the Related Art

In approximately 1974 John Deere introduced its Max Emerge Model 7000 planter, which included gauge wheels that carry the weight of the row unit, and gauge wheel arms that supported the offset loads of the gauge wheels. Because of the way the offset loads are supported by the gauge wheel arms, the durability of the gauge wheel arms and their pivot mounting was poor. The ground load on the gauge wheel is offset from the center of the row where the arm pivots upward and engages an adjustable stop.

Because of the offset load the arm is always trying to lean sideways. The load then is supported by two points of contact between the pivot pin and the bore of the hub. One point is on top of the pin at the inner end of the hub, and the other point is on the bottom of the pin at the outer end. These two points of contact are small and highly loaded. Because of the oscillating motion, grease gets squeezed out of these two points of contact and does not get carried back into them.

As a result the two points of contact are bound to wear. As they wear the arm leans allowing the tire to pull away from the opener disk. This eventually allows moist soil sticking to the disk to be carried up into the space between the wheel and opener disk. A scraper removes the soil from the disk which then can accumulate and plug this space. The same plugging can occur with trash.

In 1994, the Applicant introduced a gauge wheel arm mounting assembly that used a disc spring (Belleville Washer) to support the offset load. This gauge wheel arm mounting assembly is illustrated in FIGS. 5, 6 and 7 of Applicant's U.S. Pat. No. 5,904,107. Shims were used to set the spring pressure.

After one year it was apparent that a simpler method of adjusting the spring pressure was needed. A threaded adjustment was then developed by the Applicant, which is shown in FIGS. 8 and 9 of U.S. Pat. No. 5,904,107. This threaded adjustment later evolved into an attaching method shown in Applicant's Instruction Sheet AI-1250. Item K in instruction sheet AI-1250 is an adjusting stud assembly. The adjusting stud is machined from bar stock and has a tapped hole. The attaching stud is a threaded stud screwed into the tapped hole. The attaching stud is fixed within the adjusting stud using, for example, a thread adhesive compound. The attaching stud is screwed into the tapped hole in the end of the fixed pivot pin (not shown).

Disc spring pressure is adjusted by a nylon insert locknut J. Properly installed a force of approximately 1500 lbs. is applied to the ends of the hub. This is more than required to prevent the arm from leaning but it can still pivot freely. Because the arm cannot lean the pressure on the ends of the hub is evenly distributed around the circle of contact which is a big area. This results in the wear almost being eliminated. The result is that the tire can be adjusted to stay in contact with the opener disk indefinitely. Adjusting washers at each end of the hub are used to establish the proper relationship between the tire and opener disk.

In 1997, the John Deere Model 1700 planter model was introduced. The gauge wheel arm pivot incorporated a threaded bushing which allowed the arm to be moved in or out simply by loosening a bolt and turning the threaded bushing. No adjusting washers are needed. This gauge wheel arm pivot assembly is illustrated in FIGS. 2 and 3 of U.S. Pat. No. 5,427,038.

To use the RKP gauge wheel arm pivot kit with the Model 1700 planter, it was necessary to replace the threaded bushing with a split bushing F, as illustrated in Applicant's Instruction Sheet AI-1251.

In 2014, the John Deere Model MaxEmerge 5 (ME5) planter row unit was introduced, which included a redesigned gauge wheel arm. The redesigned gauge wheel arm still provides a threaded feature for adjusting the position of the gauge wheels. It also has a bearing surface at each end of the bore of the hub. The gauge wheel arm mounting assembly for the Model ME5 planter is illustrated in FIGS. 2 and 3 of U.S. Pat. No. 8,387,715.

In 1998, the disc spring design used on planter gauge wheel arm pivots was adapted to the early John Deere Model 750 no-till drills, as shown on Applicant's Instruction Sheet AI-1240. This drill did not have sleeve bearings and it was very impractical to try to repair it. The problem of wear on the pivot was very similar to that of the planter gauge wheel arm pivot.

The Applicant's disc spring design was successfully used in the Model 750 drills, and was later adapted to the other model drills, as shown in Applicant's Instruction Sheet AI-1242.

However, there is still a need for an improved mounting structure for mounting a pivot arm, such as a gauge wheel arm or a closing wheel arm, to an implement.

SUMMARY OF THE INVENTION

An object of the present invention is to provide an improved mounting structure for mounting a pivot arm, such as a gauge wheel arm or a closing wheel arm, to an implement.

A further object of the present invention is to provide a mounting structure for mounting a pivot arm to a seed planting implement, which creates a lateral bearing force against a bearing housing.

A further object of the present invention is to provide a mounting structure for mounting a pivot arm to a seed planting implement, which can be retrofit to existing implements.

To accomplish these and other objects of the present invention, a mounting structure is provided for mounting a pivot arm to an implement, which has a cylindrical member, an adjusting sleeve, and a mounting bolt extending through the cylindrical member and adjusting sleeve to fix the cylindrical member and adjusting sleeve together. The cylindrical member extends through a bore of a bearing housing for rotation relative to the bearing housing. The adjusting sleeve has a threaded external surface. A disc spring is positioned on the adjusting sleeve. An adjusting nut is threaded onto the threaded external surface of the adjusting sleeve. The adjusting nut can be tightened to compress the disc spring to create a lateral bearing force against the bearing housing. The bearing housing can be integral with a pivot arm for mounting a gauge wheel assembly on a planter row unit, or the bearing housing can be a fixed part for mounting a pivot arm for a closing/press wheel on a drill.

According to one aspect of the present invention, a row unit is provided for an implement, comprising: a frame; a gauge wheel assembly; a pivot arm having a first end coupled to the gauge wheel assembly and a second end comprising a hub for pivotally mounting the pivot arm to the frame, the hub having a bore therethrough; a cylindrical member having an inner end and an outer end, the cylindrical member extending through the bore of the hub with the inner end of the cylindrical member adjacent to the frame and the cylindrical member being coaxial with the bore of the hub; an adjusting sleeve having an outer end, an inner end, an inner bore, and a threaded outer surface, the adjusting sleeve being positioned coaxial with the cylindrical member with the inner end of the adjusting sleeve adjacent to the outer end of the cylindrical member; a mounting bolt having a head at one end, the bolt extending through the inner bore in the adjusting sleeve with the bolt head adjacent to the outer end of the adjusting sleeve and a threaded portion of the bolt extending beyond the inner end of the adjusting sleeve for insertion into a female threaded portion of the cylindrical member or the frame, the mounting bolt being threaded into the female threaded portion and tightened to fix the cylindrical member and adjusting sleeve to the frame while allowing rotation of the hub and pivot arm about the cylindrical member; at least one disc spring positioned on the adjusting sleeve; and a nut threaded onto the threaded outer surface of the adjusting sleeve, the nut compressing the disc spring to restrain the hub on the cylindrical member such that compression of the disc spring creates a lateral bearing force on the hub which is transferred to the frame.

According to another aspect of the present invention, a mounting structure is provided for mounting a gauge wheel assembly to a frame of a row unit of an implement, the mounting structure comprising: a pivot arm having a first end adapted to be coupled to a gauge wheel assembly and a second end comprising a hub for pivotally mounting the pivot arm to the frame, the hub having a bore therethrough; a cylindrical member having an inner end and an outer end, the cylindrical member extending through the bore of the hub with the inner end of the cylindrical member adjacent to the frame and the cylindrical member being coaxial with the bore of the hub; an adjusting sleeve having an outer end, an inner end, an inner bore, and a threaded outer surface, the adjusting sleeve being positioned coaxial with the cylindrical member with the inner end of the adjusting sleeve adjacent to the outer end of the cylindrical member; a mounting bolt having a head at one end, the bolt extending through the inner bore in the adjusting sleeve with the bolt head adjacent to the outer end of the adjusting sleeve and a threaded portion of the bolt extending beyond the inner end of the cylindrical member for insertion into a female threaded portion of the cylindrical member or the frame, the mounting bolt being threaded into the female threaded portion and tightened to fix the cylindrical member and adjusting sleeve to the frame while allowing rotation of the hub and pivot arm about the cylindrical member; at least one disc spring positioned on the adjusting sleeve; and a nut threaded onto the threaded outer surface of the adjusting sleeve, the nut compressing the disc spring to restrain the hub on the cylindrical member such that compression of the disc spring creates a lateral bearing force on the hub which is transferred to the frame.

Numerous other objects of the present invention will be apparent to those skilled in this art from the following description wherein there is shown and described example embodiments of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIGS. 4 and 5 are exploded perspective views showing the two different types of sleeve bearings that can be used, and FIG. 6 is an exploded perspective view of the pivot arm mounting structure according to the present invention.

FIGS. 7 and 8 are exploded perspective views showing the two different types of sleeve bearings that can be used, and FIG. 9 is an exploded perspective view of the pivot arm mounting structure according to the present invention.

DETAILED DESCRIPTION OF THE INVENTION

A mounting structure 10 for mounting a gauge wheel pivot arm 11 to a planter row unit 12 according to a first embodiment of the present invention will be described in detail with reference to FIGS. 1 to 9 of the accompanying drawings.

Figure 1:
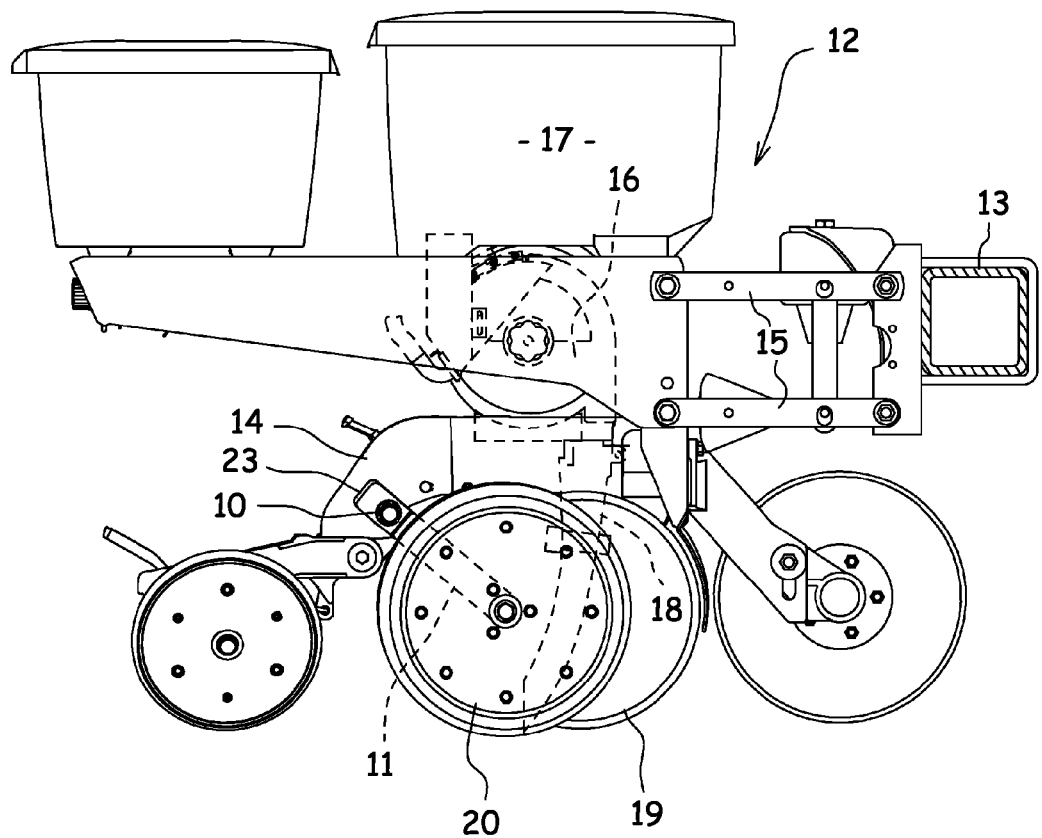
FIG. 1 is a side view of a planter row unit having a gauge wheel assembly with a pivot arm attached to the row unit frame with a mounting structure according to a first embodiment of the present invention.
Figure 2:
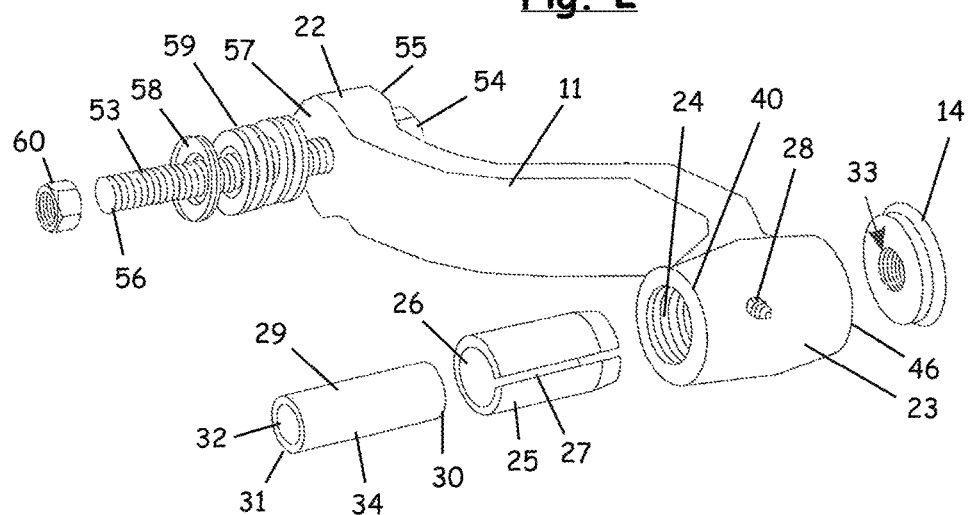
FIG. 2 is an exploded perspective view of the pivot arm with a threaded member at one end for attaching a gauge wheel to the pivot arm, and a hub at the other end for attaching the pivot arm to the row unit frame.

An agricultural planter row unit 12 is illustrated in FIG. 1. The row unit 12 is attached to a transverse toolbar 13 in a conventional manner. The row unit 12 has a frame 14 coupled to the toolbar 13 by a parallel linkage 15 to allow vertical movement of the row unit 12 relative to the toolbar 13. A seed meter 16 singulates seed from a seed pool in the seed hopper 17 and drops the seeds through a seed tube 18 into a planting furrow. The furrow is formed in the soil by a furrow opener having pair of closely spaced opener disks 19.

Gauge wheels 20 control the depth of the furrow and are mounted to the frame 14 by respective pivot arms 11. One gauge wheel 20 is adjacent to the outer side of each opener disk 19.

The frame 14 has a threaded hole 33 on each side for mounting the pivot arms 11 to the frame 14. The pivot arms 11 each have a first end 22 coupled to the gauge wheel 20, and a second end with a hub 23 for pivotally mounting the pivot arm 11 to the frame 14.

The hub 23 has a bore 24 therethrough into which an oversize sleeve bearing, such as a split bushing 25, is pressed. The split bushing 25 has an inner bore 26 and a longitudinal split 27. The longitudinal split 27 allows the split bushing 25 to be pressed into the bore 24 of the hub 23.

Figure 11:
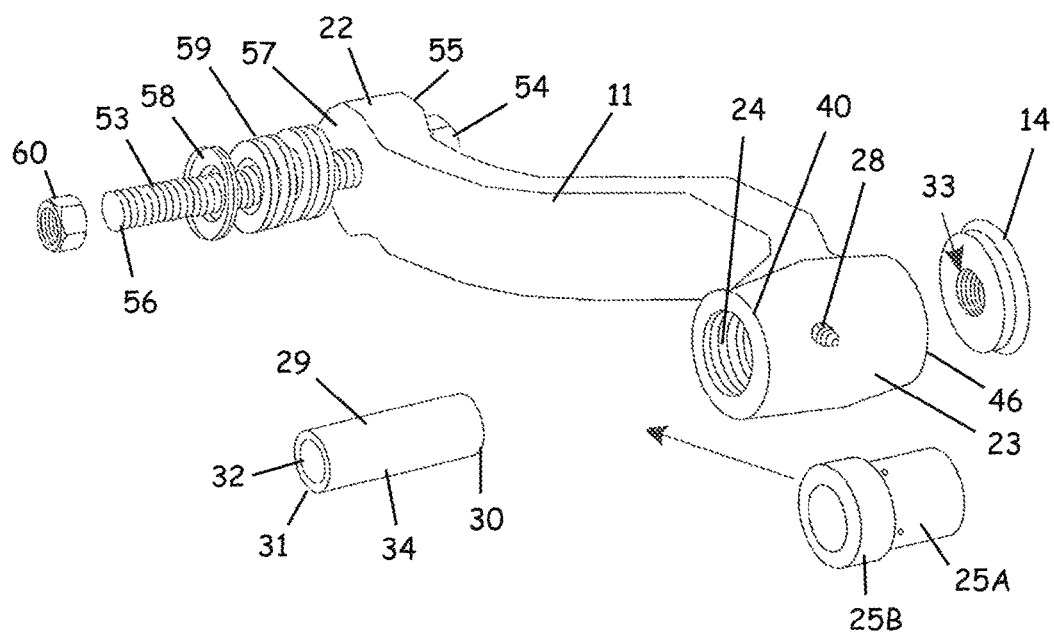
FIG. 11 is an exploded perspective view of the pivot arm and other components of the mounting structure, according to an alternative embodiment in which a heat treated sleeve bearing having an enlarged section at one end is slipped into the hub and held in place with a retaining compound.

In an alternative embodiment, as illustrated in FIG. 11, a heat treated sleeve bearing 25A having an enlarged section 25B at one end can be slipped into the hub 23 and held in place with a retaining compound, such as a two-part epoxy material. The sleeve bearing 25A in this embodiment is shaped to fit snugly into the hub bore 24 of a late model John Deere planter in which the hub bore 24 is only partially threaded and has an enlarged bore section at one end.

Two variations of the mounting structure 10 according to the first embodiment of the invention are illustrated in FIGS. 2 to 9. The first variation is illustrated in FIGS. 2 to 6 and uses a long bolt 41 that passes through the mounting structure and is threaded into the threaded hole 33. A cylindrical member in the form of a bushing 29 extends through the bore 26 of the sleeve bearing 25 within the hub bore 24. The outer surface of the bushing 29 provides the bearing surface that engages the inner bore 26 of the sleeve bearing 25, 25A to allow the arm 11 to rotate relative to the frame 14.

The bushing 29 in the variation illustrated in FIGS. 2 to 6 has a cylindrical body with an inner end 30, an outer end 31, and a through bore 32. The bushing 29 extends through the bore 24 of the hub 23 with the inner end 30 of the bushing 29 adjacent to the frame 14, and the through bore 32 of the bushing 29 coaxial with the threaded hole 33 in the frame 14. The outer surface 34 of the bushing 29 provides a bearing surface that engages the inner bore 26 of the sleeve bearing 25 to allow rotation of the hub 23 about the bushing 29. The bushing 29 remains fixed relative to the frame 14 once the bolt 41 is tightened.

Figure 7:
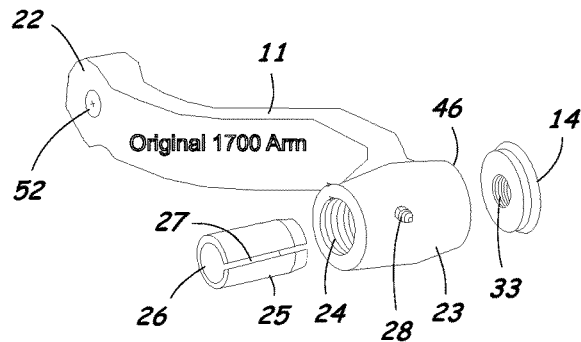
FIGS. 7, 8 and 9 illustrate a pivot arm mounting structure according to the first embodiment of the present invention, which uses a pivot pin fixed on the row unit frame.
Figure 8:
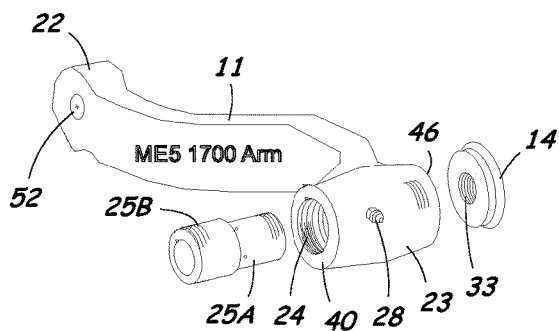
Figure 9:
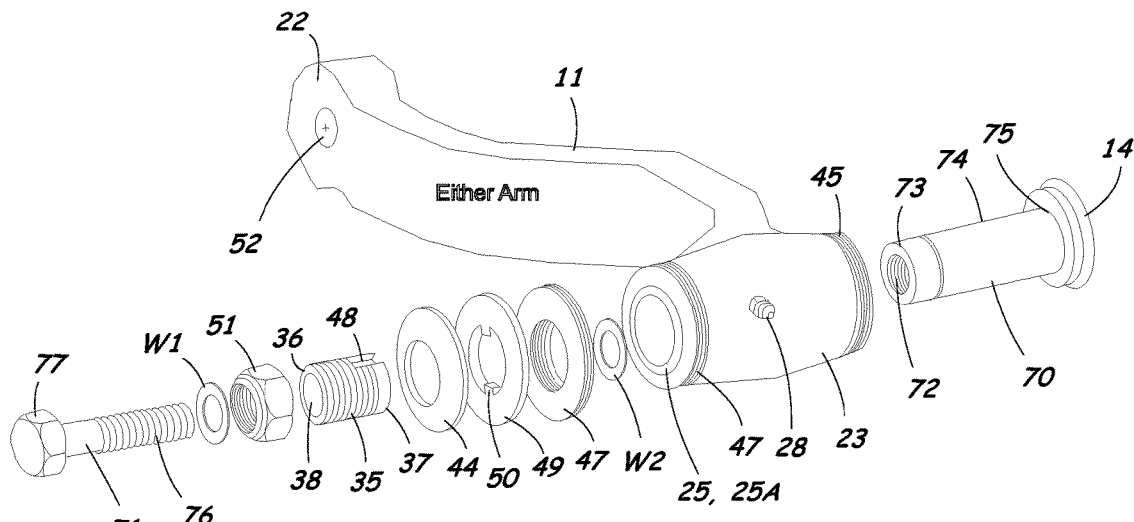

The second variation is illustrated in FIGS. 7 to 9 and uses a pivot pin 70 fixed to the threaded hole 33 on the row unit frame 14. A shorter bolt 71 passes through a portion of the mounting structure into a threaded portion 72 at the outer end 73 of the pivot pin 70. In this variation, the outer surface 74 of the pivot pin 70 is a cylindrical member that provides a bearing surface that engages the inner bore 26 of the sleeve bearing 25, 25A to allow the arm 11 to rotate relative to the frame 14.

The pivot pin 70 in the variation illustrated in FIGS. 7 to 9 has an inner end 75 with an inner bore (not shown) with female threads that receive a threaded stud (not shown). The threaded stud is threaded into the threaded hole 33 to fix the pivot pin 70 to the frame 14. Alternatively, the pivot pin 70 can have an integral male threaded portion extending from its inner end 75 for mating with the female threads of the threaded hole 33 to fix the pivot pin 70 to the frame 14.

An adjusting sleeve 35 is positioned coaxial with the bushing 29 or the pivot pin 70. The adjusting sleeve 35 has an outer end 36, an inner end 37, an inner bore 38, and a threaded external surface 39. The inner end 37 of the adjusting sleeve 35 is adjacent to the outer end 40 of the housing 23 and abuts with the outer end 31 of the bushing 29 or the outer end 73 of the pivot pin 70. The inner bore 38 of the adjusting sleeve 35 is a smooth bore.

The mounting bolt 41 in FIGS. 2 to 6 extends through the inner bore 38 of the adjusting sleeve 35 and the through bore 32 in the bushing 29. The mounting bolt 41 has a head 42 at one end adjacent to the outer end 36 of the adjusting sleeve 35. A first washer W1 (FIG. 6) can be positioned between the head 42 of the bolt 41 and the outer end 36 of the adjusting sleeve 35. A second washer W2 (FIG. 6) can be positioned between the inner end 37 of the adjusting sleeve 35 and the outer end 31 of the bushing 29. A threaded portion 43 of the mounting bolt 41 extends beyond the inner end 30 of the bushing 29 for insertion into the threaded hole 33 in the frame 14. The mounting bolt 41 is threaded into the threaded hole 33 and tightened to fix the bushing 29 and adjusting sleeve 35 to the frame 14, while allowing rotation of the hub 23 and pivot arm 11 about the bushing 29. For example, the bolt 41 can be tightened to a torque of approximately 200 ft-lbs.

The mounting bolt 71 in FIGS. 7 to 9 extends through the inner bore 38 of the adjusting sleeve 35 and has a threaded portion 76 that mates with the threaded portion 72 at the outer end 73 of the pivot pin 70. The mounting bolt 71 has a head 77 at one end adjacent to the outer end 36 of the adjusting sleeve 35. A first washer W1 can be positioned between the head 77 of the bolt 71 and the outer end 36 of the adjusting sleeve 35. A second washer W2 can be positioned between the inner end 37 of the adjusting sleeve 35 and the outer end 73 of the pivot pin 70. The mounting bolt 71 is threaded into the threaded portion 72 of the pivot pin 70 and tightened to fix the adjusting sleeve 35 to the pivot pin 70 and the frame 14, while allowing rotation of the hub 23 and pivot arm 11 about the pivot pin 70. For example, the bolt 71 can be tightened to a torque of approximately 200 ft-lbs.

At least one disc spring 44 is positioned on the adjusting sleeve 35. A selected number of first adjusting washers 45 are positioned on the bushing 29 or the pivot pin 70 between the inner side 46 of the hub 23 and the frame 14. A selected number of second adjusting washers 47 are positioned on the bushing 29 or the pivot pin 70 between the outer end 40 of the hub 23 and the disc spring 44.

The adjusting sleeve 35 has at least one keyway 48, and preferably two keyways, on its external surface 39. A tab washer 49 is positioned on the adjusting sleeve 35 between the second adjusting washers 47 and the disc spring 44. The tab washer 49 has at least one tab 50, and preferably two tabs, mated with the keyway(s) 48 on the adjusting sleeve 35. The tab washer 49 minimizes relative rotation and resulting wear between the disc spring 44 and the tab washer 49.

A nut 51 is threaded onto the threaded external surface 39 of the adjusting sleeve 35. The nut 51 preferably comprises a locknut having a nylon insert to prevent the nut from loosening on the adjusting sleeve 35 during use. The nut 51 is tightened to compress the disc spring 44 to restrain the hub 23 on the bushing 29 or the pivot pin 70. Compression of the disc spring 44 creates a lateral bearing force on the hub 23 which is transferred to the frame 14.

The first end 22 of the pivot arm 11 has a tapped hole 52. A second bolt 53 is threaded into the tapped hole 52 with a head 54 of the second bolt 53 adjacent to an inner side 55 of the pivot arm 11. The head 54 of the second bolt 53 is thinner (e.g., approximately ¼ inch) than a standard bolt head to prevent contact of the head 54 with the adjacent opener disk blade 19. A free end 56 of the second bolt 53 extends outwardly from an outer side 57 of the pivot arm 11. The second bolt 53 is tightened within the tapped hole 52 of the pivot arm 11 to a torque of approximately 50 ft-lbs.

Figure 3:
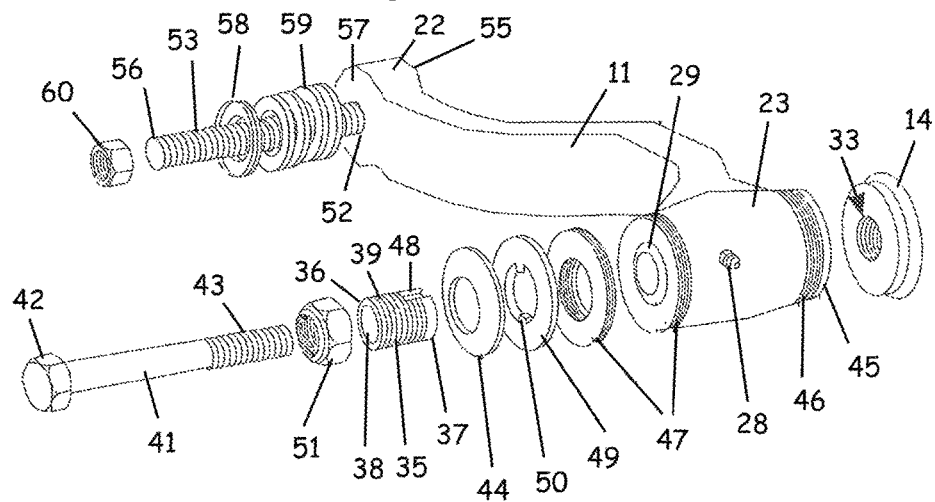
FIG. 3 is an exploded perspective view of the pivot arm and other components of the mounting structure of the first embodiment of the present invention.
Figure 4:
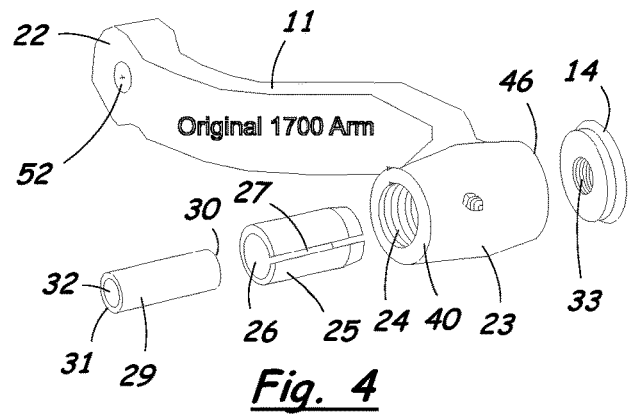
FIGS. 4, 5 and 6 illustrate a pivot arm mounting structure according to the first embodiment of the present invention, which uses a long bolt threaded into a threaded opening in the row unit frame.
Figure 5:
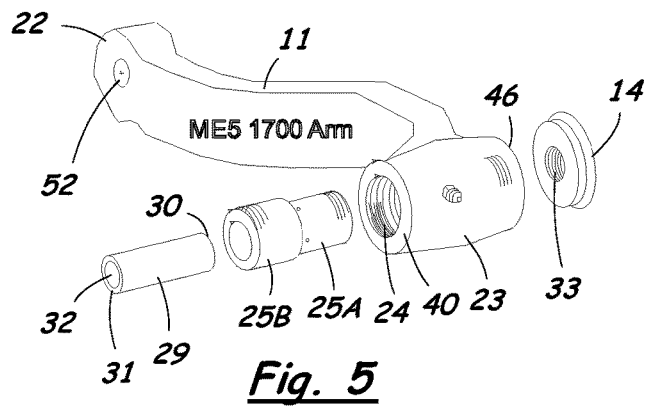

Alternatively, the second bolt 53 can be a threaded stud without a head to ensure that the bolt will not protrude from the inner side of the pivot arm 11 and interfere with the adjacent opener disk blade 19. FIG. 3 illustrates a second bolt 53 in the form of a threaded stud without a head protruding on the inner side of the pivot arm 11. A thread seizing compound, such as Loctite Threadlocker™, can be used on the threaded stud to prevent it from loosening.

A selected number of third adjusting members 58, 59 are positioned on the second bolt 53 between the gauge wheel assembly 20 and the outer side 57 of the pivot arm 11. The third adjusting members include a plurality of shims 58 and washers 59 to adjust a lateral position of the gauge wheel assembly 20.

The gauge wheel assembly 20 is placed onto the free end 56 of the second bolt 53, and a wheel nut 60 is threaded onto the free end 56 of the second bolt 53 to secure the gauge wheel assembly 20 to the pivot arm 11.

The following process can be used to remove the OEM gauge wheel arm from a planter row unit 12 and install the gauge wheel arm pivot assembly 10 of the present invention.

The gauge wheel 20 is removed from the pivot arm 11 by removing the OEM axle bolt (not shown) at the center of the gauge wheel 20, which is threaded into the tapped hole 52 at the end 22 of the pivot arm 11.

The pivot arm 11 is removed by removing the mounting bolt 41 from the threaded hole 33 in the frame 14. A threaded OEM bushing (not shown) is removed from the hub 23 and can be discarded. If necessary, the ends 40, 46 of the hub 23 can be filed to make sure they are smooth and flat and free of excessive paint. Care should be taken to make sure that the adjusting washers 45, 47 will lay flat on the inner end 46 of the hub 23. If the pivot arm 11 interferes with the adjusting washers 45, 47 laying flat, the interference can be eliminated by grinding.

The split bushing 25 is then pressed into the bore 24 of the hub 23. As described above, the split bushing 25 can have an alternative configuration 25A as needed to fit snugly within the bore 24 of the hub 23.

The second bolt 53 is threaded into the tapped hole 52 at the first end 22 of the pivot arm 11 until its head 54 is tight against the inner surface 53 of the pivot arm 11. The second bolt 53 is tightened to a torque of approximately 50 ft-lbs. Alternatively, a threaded stud can be threaded into the tapped hole 52 and secured in position by a suitable thread seizing compound, such as Loctite Threadlocker™.

Figure 6:
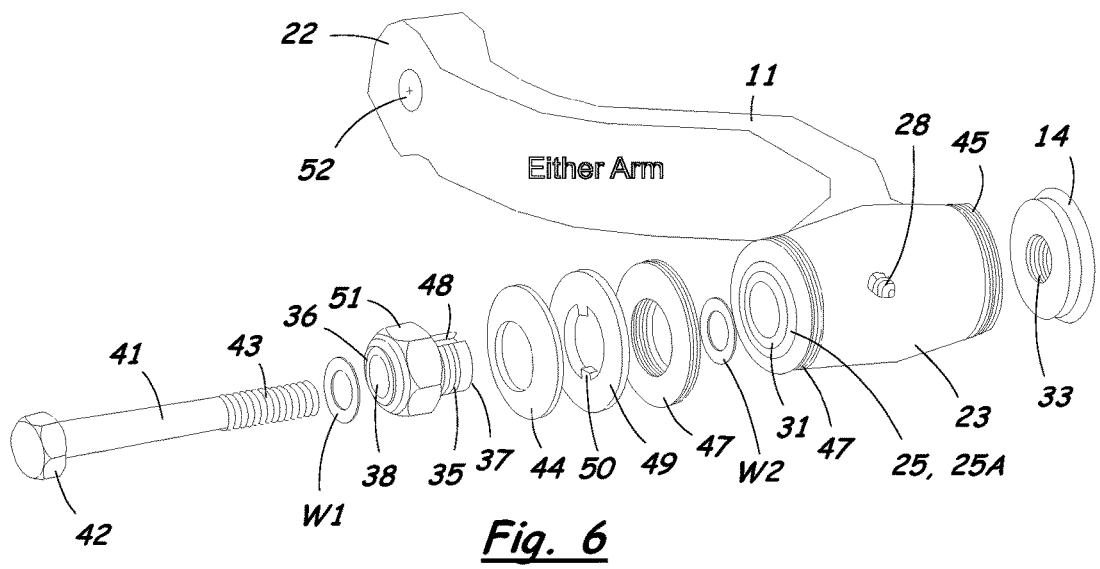

The pivot bushing 29 or the pivot pin 70 is inserted into the bore 26 of the sleeve bearing 25, 25A. The locknut 51 is installed onto the adjusting sleeve 35 flush with the outer end 36 of the adjusting sleeve 35, as shown in FIG. 6. The disc spring 44 and tab washer 49 are installed onto the adjusting sleeve 35. The mounting bolt 41 (FIGS. 2 to 6) is then installed through the adjusting sleeve 35, the pivot bushing 29, and the remaining parts as shown and into the threaded hole 33 in the frame 14, or the mounting bolt 71 (FIGS. 7 to 9) is installed through the adjusting sleeve 35 and the remaining parts as shown and into the threaded portion 72 of the pivot pin 70.

Adjusting washers 45, 47 are used to adjust the clearance between the pivot arm 11 and the gauge wheel assembly 20 and the opener disk 19. A few shims 58 can also be used to position the gauge wheel 20 properly on the pivot arm 11. The adjusting washers 45, 47 should be lubricated with a light coating of oil.

The mounting bolt 41, 71 can then be tightened to a torque of approximately 200 ft-lbs. The pivot arm 11 should still be loose for rotation on the bushing 29 or the pivot pin 70 after the mounting bolt 41, 71 is tightened.

Several washers 59 are then placed onto the second bolt 53, and the gauge wheel 20 is loosely placed onto the bolt 53. The locknut 51 is then tightened to increase the disc spring 44 pressure on the hub 23 of the arm 11 to the point that when the wheel 20 is raised it will just stay up. It should take a small force to push the wheel 20 down, and care should be taken not to over-tighten the locknut 51. The wheel 20 should be kept high enough that it does not interfere with the bearing housing of the opener disk 19.

The wheel nut 60 is threaded onto the second bolt 53 to hold the wheel 20 on the pivot arm 11. The number of shims 58 and washers 59 can be adjusted to obtain a light pressure between the tire of the gauge wheel assembly 20 and the opener disk 19. The pressure should be just high enough that when the wheel 20 is turned by hand the opener disk 19 will also turn. When planting with the row unit 12, the ground load will cause the opener disk 19 to flex inward slightly and the tire of the gauge wheel assembly 20 to flex outward slightly. The pressure between the tire 20 and the opener disk 19 will be reduced during actual planting due to the flexing caused by the ground load.

The mounting structure 10 of the present invention, when properly installed, will result in the opener disks 19 being cleaned by the tires of the gauge wheel assembly 20. This may allow the OEM scrapers for the opener disks 19 to be eliminated from the row unit 12.

Figure 10:
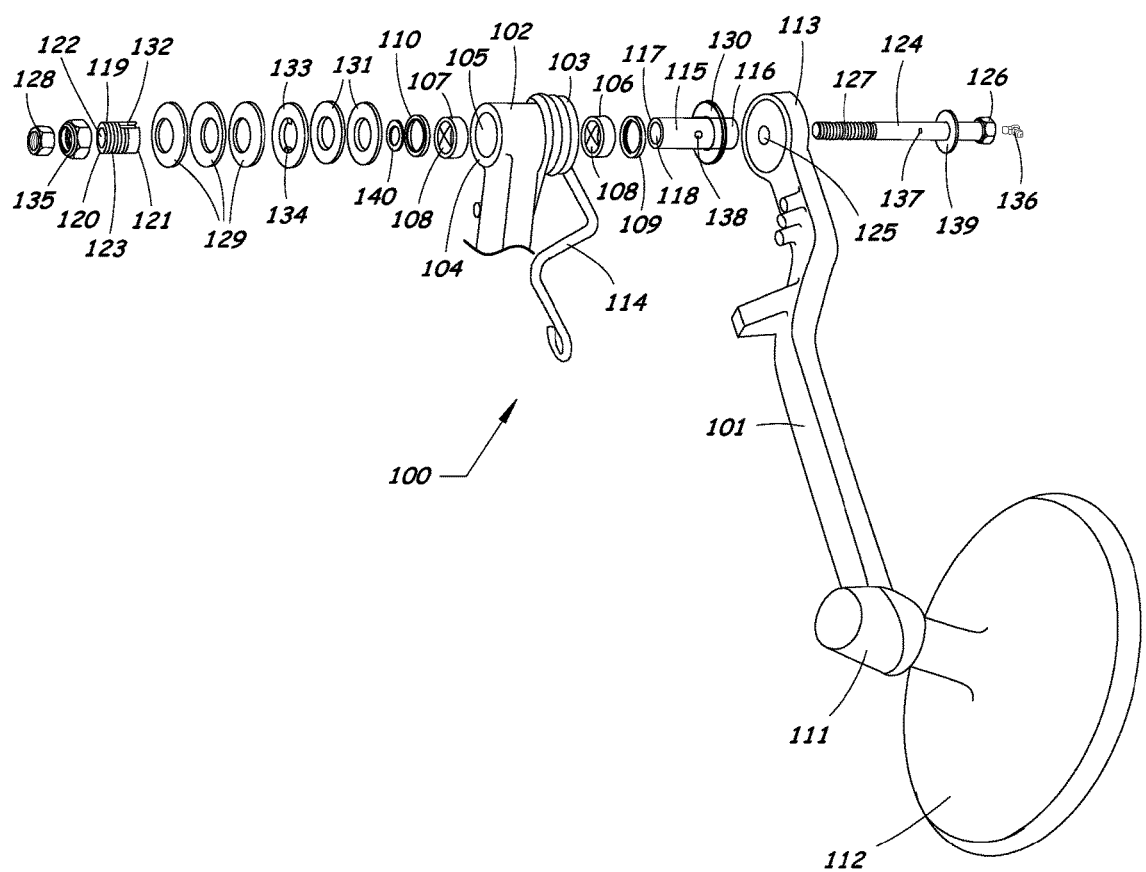
FIG. 10 is an exploded perspective view of a pivot arm and mounting structure for attaching a closing wheel to a no-till grain drill implement according to a second embodiment of the present invention.

A mounting structure 100 for mounting a closing wheel pivot arm 101 to a no-till agricultural seeding drill according to a second embodiment of the present invention will now be described in detail with reference to FIG. 10 of the accompanying drawings. The mounting structure 100 is used to rotatably mount the closing wheel arm 101 to a bearing housing 102 on the drill.

The bearing housing 102 has a first side 103, a second side 104, and a bore 105 extending therethrough. A pair of grooved sleeve bearings 106, 107 are fixed within the bore 105 of the bearing housing 102. The sleeve bearings 106, 107 each have an inner bore 108 that provides a bearing surface. A pair of seals 109, 110 are installed on each side of the bearing housing 102 to keep dirt out of the bearing housing 102.

The pivot arm 101 has a first end 111 coupled to a rotatable closing wheel 112 and a second end 113 coupled to the bearing housing 102 by the mounting structure 100. A spring 114 is used to bias the pivot arm 101 downward to transfer down force from the implement to the closing wheel 112.

A bushing 115 extends through the inner bores 108 of the sleeve bearings 106, 107 within the bore 105 of the bearing housing 102. The bushing 115 has a cylindrical body with an inner end 116, an outer end 117, and a through bore 118. The bushing 115 extends through the bore 105 of the bearing housing 102 with the outer end 118 of the bushing 115 adjacent to the second side 104 of the bearing housing 102, and the inner end 116 of the bushing 115 adjacent to the second end 113 of the pivot arm 101. The outer surface of the bushing 115 provides a bearing surface that engages the inner bores 108 of the sleeve bearings 106, 107 to allow rotation of the bushing 115 within the bearing housing 102.

An adjusting sleeve 119 is positioned coaxial with the bushing 115. The adjusting sleeve 119 has an outer end 120, an inner end 121, an inner bore 122, and a threaded external surface 123. The inner end 121 of the adjusting sleeve 119 is adjacent to the outer end 117 of the bushing 115.

A mounting bolt 124 extends through a bore 125 in the second end 113 of the pivot arm 101 and the through bore 118 in the bushing 115 and the inner bore 122 in the adjusting sleeve 119. The mounting bolt 124 has a head 126 at one end and a threaded portion 127 at the other end. A nut 128 is threaded onto the threaded portion 127 of the mounting bolt 124 and tightened to fix the pivot arm 101, bushing 115 and adjusting sleeve 119 together while allowing rotation of the bushing 115 within the sleeve bearings 106, 107 in the bearing housing 102. For example, the bolt 124 and nut 128 can be tightened to a torque of approximately 150 ft-lbs.

At least one disc spring 129 is positioned on the adjusting sleeve 119. In the illustrated embodiment, a group of three disc springs 129 are positioned on the adjusting sleeve 119. A first thrust washer 130 is positioned between the second end 113 of the pivot arm 101 and the bearing housing 102. A pair of second thrust washers 131 is positioned between the disc springs 129 and the bearing housing 102.

The adjusting sleeve 119 has at least one keyway 132, and preferably two keyways, on its external surface 123. A tab washer 133 is positioned on the adjusting sleeve 119 between the second thrust washers 131 and the disc springs 129. The tab washer 133 has at least one tab 134, and preferably two tabs, mated with the keyway(s) 132 on the adjusting sleeve 119. The tab washer 133 minimizes rotative motion and resulting wear between the disc springs 129 and the tab washer 133.

An adjusting nut 135 is threaded onto the threaded external surface 123 of the adjusting sleeve 119. The adjusting nut 135 preferably comprises a locknut having a nylon insert to prevent the nut 135 from loosening on the adjusting sleeve 119 during operation. The adjusting nut 135 is tightened to compress the disc springs 129 to create a lateral bearing force between the pivot arm 101 and the bearing housing 102.

The mounting bolt 124 has a grease zerk 136 and a lubrication port 137 extending through its shaft for delivering lubricating material into the bearing housing 102. The lubricating material can be delivered through the mounting bolt 124 to the inner bore 118 of the bushing 115, and through a corresponding port 138 in the bushing 115 to the inner bore 105 of the bearing housing 102 to lubricate the bearing surfaces between the outer surface of the bushing 115 and the inner bores 108 of the sleeve bearings 106, 107.

The following process can be used to remove the OEM closing wheel arm from a drill and install the closing wheel arm pivot assembly of the present invention.

The closing wheel arm 101 is removed from the bearing housing 102, and the old OEM sleeve bearings (not shown) are removed from the bearing housing 102 and may be discarded.

New grooved sleeve bearings 106, 107 are installed in the bearing housing 102. The outer ends of the bearings 106, 107 should be approximately ¼" from the ends 103, 104 of the bearing housing 102. If a grease zerk which was previously installed in the bearing housing is to be used, it may be necessary to drill a small hole through the sleeve bearing in line with the tapped hole in the bearing housing.

The seals 109, 110 are then installed in the ends 103, 104 of the bearing housing 102 with the lips of the seals 109, 110 facing outward. This arrangement of the seals 109, 110 is important to allow grease to be able to pass through the seals 109, 110. The seals 109, 110 are pressed into the bearing housing 102 until they are flush with the ends 103, 104 of the housing 102.

Grease is applied to the lips of the seals 109, 110 and to one end of the pivot bushing 115. The pivot bushing 115 is installed into the bearing housing 102 through the inner bores of the seals 109, 110 and sleeve bearings 106, 107 being careful not to damage the seals 109, 110. The thrust washer 130 is installed onto the end 116 of the pivot bushing 115.

The locknut 135 is installed flush with the outer end 120 of the adjusting sleeve 119. The disc springs 129, tab washer 133, and two thrust washers 131 are installed onto the adjusting sleeve 119. The grease zerk 136 is installed into the mounting bolt 124. A washer 139 is installed onto the mounting bolt 124, and the mounting bolt 124 is installed through the bore 125 in the pivot arm 101, the pivot bushing 115, the washer 140, and the adjusting sleeve 119.

The locknut 128 is then installed onto the threaded end 127 of the mounting bolt 124 and tightened to a torque of approximately 150 ft-lbs. The large locknut 135 on the adjusting sleeve 119 is not yet tightened, and the pivot arm 101 should still be loose. The assembly 100 is then lubricated using the grease zerk 136 until grease appears at both ends 103, 104 of the bearing housing 102.

The large locknut 135 is then tightened on the adjusting sleeve 119 until there is approximately ⅓₂ to ¹⁄₁₆ of an inch gap between the two inner disc springs 129. The lateral looseness should be eliminated. When raising the pivot arm 101 by hand, resistance will be felt caused by the spring pressure of the disk springs 129, but the pivot arm 101 should not hang up. The large locknut 135 can then be adjusted as necessary.

While the invention has been specifically described in connection with specific embodiments thereof, it is to be understood that this is by way of illustration and not of limitation, and the scope of the appended claims should be construed as broadly as the prior art will permit.

What is claimed is:

1. A row unit for an implement, comprising:
   a frame;
   a gauge wheel assembly;
   a pivot arm having a first end coupled to the gauge wheel assembly and a second end comprising a hub for pivotally mounting the pivot arm to the frame, said hub having a bore therethrough;
   a cylindrical member having an inner end and an outer end, said cylindrical member extending through the bore of said hub with the inner end of the cylindrical member adjacent to the frame and the cylindrical member being coaxial with the bore of the hub;
   an adjusting sleeve having an outer end, an inner end, an inner bore, and a threaded outer surface, said adjusting sleeve being positioned coaxial with said cylindrical member with the inner end of the adjusting sleeve adjacent to the outer end of the cylindrical member;
   a mounting bolt having a head at one end, the bolt extending through the inner bore in the adjusting sleeve with the bolt head adjacent to the outer end of the adjusting sleeve and a threaded portion of the bolt extending beyond the inner end of the adjusting sleeve for insertion into a female threaded portion of said cylindrical member or the frame, said mounting bolt being threaded into the female threaded portion and tightened to fix the cylindrical member and adjusting sleeve to the frame while allowing rotation of the hub and pivot arm about the cylindrical member;

at least one disc spring positioned on said adjusting sleeve; and a nut threaded onto said threaded outer surface of said adjusting sleeve, said nut compressing said disc spring to restrain said hub on said cylindrical member such that compression of said disc spring creates a lateral bearing force on said hub which is transferred to said frame.

2. The row unit according to claim 1, further comprising a sleeve bearing fixed within the bore of said hub, said sleeve bearing having an inner bore, and said cylindrical member extending through said inner bore of the sleeve bearing with an outer surface of said cylindrical member providing a bearing surface that engages the inner bore of said sleeve bearing to allow rotation of the hub about the cylindrical member.

3. The row unit according to claim 2, wherein said sleeve bearing comprises a split bushing pressed into the bore of the hub.

4. The row unit according to claim 2, wherein said sleeve bearing comprises a heat treated sleeve bearing inserted into the bore of the hub and held in place with a retaining compound.

5. The row unit according to claim 1, further comprising a selected number of first adjusting washers positioned on said cylindrical member between an inner side of the hub and the frame.

6. The row unit according to claim 5, further comprising a selected number of second adjusting washers positioned on said cylindrical member between an outer side of the hub and said at least one disc spring.

7. A row unit for an implement, comprising:
a frame;
a gauge wheel assembly;
a pivot arm having a first end coupled to the gauge wheel assembly and a second end comprising a hub for pivotally mounting the pivot arm to the frame, said hub having a bore therethrough;
a cylindrical member having an inner end and an outer end, said cylindrical member extending through the bore of said hub with the inner end of the cylindrical member adjacent to the frame and the cylindrical member being coaxial with the bore of the hub;
an adjusting sleeve having an outer end, an inner end, an inner bore, and a threaded outer surface, said adjusting sleeve being positioned coaxial with said cylindrical member with the inner end of the adjusting sleeve adjacent to the outer end of the cylindrical member;
a mounting bolt having a head at one end, the bolt extending through the inner bore in the adjusting sleeve with the bolt head adjacent to the outer end of the adjusting sleeve and a threaded portion of the bolt extending beyond the inner end of the adjusting sleeve for insertion into a female threaded portion of said cylindrical member or the frame, said mounting bolt being threaded into the female threaded portion and tightened to fix the cylindrical member and adjusting sleeve to the frame while allowing rotation of the hub and pivot arm about the cylindrical member;
at least one disc spring positioned on said adjusting sleeve; and
a nut threaded onto said threaded outer surface of said adjusting sleeve, said nut compressing said disc spring to restrain said hub on said cylindrical member such that compression of said disc spring creates a lateral bearing force on said hub which is transferred to said frame;

wherein said adjusting sleeve comprises at least one keyway on its outer surface, and further comprising a tab washer positioned on said adjusting sleeve between said second adjusting washers and said at least one disc spring, said tab washer having at least one tab mated with said at least one keyway to minimize rotative motion and resulting wear between the disc spring and the tab washer.

8. The row unit according to claim 1, wherein said nut comprises a locknut having a nylon insert.

9. The row unit according to claim 1, wherein said first end of said pivot arm comprises a tapped hole, a threaded member threaded into said tapped hole, a free end of said threaded member extending outwardly from an outer side of said pivot arm, said gauge wheel assembly placed onto said free end of said threaded member, and a wheel nut threaded onto said free end of said threaded member to secure said gauge wheel assembly to said pivot arm.

10. The row unit according to claim 9, further comprising a selected number of third adjusting members positioned on said threaded member between said gauge wheel assembly and said outer side of said pivot arm.

11. The row unit according to claim 10, wherein said adjusting members comprise washers and shims to adjust a lateral position of said gauge wheel assembly.

12. A mounting structure for mounting a gauge wheel assembly to a frame of a row unit of an implement, the mounting structure comprising:
a pivot arm having a first end adapted to be coupled to a gauge wheel assembly and a second end comprising a hub for pivotally mounting the pivot arm to the frame, said hub having a bore therethrough;
a cylindrical member having an inner end and an outer end, said cylindrical member extending through the bore of said hub with the inner end of the cylindrical member adjacent to the frame and the cylindrical member being coaxial with the bore of the hub;
an adjusting sleeve having an outer end, an inner end, an inner bore, and a threaded outer surface, said adjusting sleeve being positioned coaxial with said cylindrical member with the inner end of the adjusting sleeve adjacent to the outer end of the cylindrical member;
a mounting bolt having a head at one end, the bolt extending through the inner bore in the adjusting sleeve with the bolt head adjacent to the outer end of the adjusting sleeve and a threaded portion of the bolt extending beyond the inner end of the cylindrical member for insertion into a female threaded portion of said cylindrical member or the frame, said mounting bolt being threaded into the female threaded portion and tightened to fix the cylindrical member and adjusting sleeve to the frame while allowing rotation of the hub and pivot arm about the cylindrical member;
at least one disc spring positioned on said adjusting sleeve; and
a nut threaded onto said threaded outer surface of said adjusting sleeve, said nut compressing said disc spring to restrain said hub on said cylindrical member such that compression of said disc spring creates a lateral bearing force on said hub which is transferred to said frame.

13. The mounting structure according to claim 12, further comprising a sleeve bearing fixed within the bore of said hub, said sleeve bearing having an inner bore, and said cylindrical member extending through said inner bore of the sleeve bearing with an outer surface of said cylindrical member providing a bearing surface that engages the inner bore of said sleeve bearing to allow rotation of the hub about the cylindrical member.

14. The mounting structure according to claim 13, wherein said sleeve bearing comprises a split bushing pressed into the bore of the hub.

15. The mounting structure according to claim 13, wherein said sleeve bearing comprises a heat treated sleeve bearing inserted into the bore of the hub and held in place with a retaining compound.

16. The mounting structure according to claim 12, further comprising a selected number of first adjusting washers positioned on said cylindrical member between an inner side of the hub and the frame.

17. The mounting structure according to claim 16, further comprising a selected number of second adjusting washers positioned on said cylindrical member between an outer side of the hub and said at least one disc spring.

18. A mounting structure for mounting a gauge wheel assembly to a frame of a row unit of an implement, the mounting structure comprising:
  a pivot arm having a first end adapted to be coupled to a gauge wheel assembly and a second end comprising a hub for pivotally mounting the pivot arm to the frame, said hub having a bore therethrough;
  a cylindrical member having an inner end and an outer end, said cylindrical member extending through the bore of said hub with the inner end of the cylindrical member adjacent to the frame and the cylindrical member being coaxial with the bore of the hub;
  an adjusting sleeve having an outer end, an inner end, an inner bore, and a threaded outer surface, said adjusting sleeve being positioned coaxial with said cylindrical member with the inner end of the adjusting sleeve adjacent to the outer end of the cylindrical member;
  a mounting bolt having a head at one end, the bolt extending through the inner bore in the adjusting sleeve with the bolt head adjacent to the outer end of the adjusting sleeve and a threaded portion of the bolt extending beyond the inner end of the cylindrical member for insertion into a female threaded portion of said cylindrical member or the frame, said mounting bolt being threaded into the female threaded portion and tightened to fix the cylindrical member and adjusting sleeve to the frame while allowing rotation of the hub and pivot arm about the cylindrical member;
  at least one disc spring positioned on said adjusting sleeve; and
  a nut threaded onto said threaded outer surface of said adjusting sleeve, said nut compressing said disc spring to restrain said hub on said cylindrical member such that compression of said disc spring creates a lateral bearing force on said hub which is transferred to said frame;
  wherein said adjusting sleeve comprises at least one keyway on its outer surface, and further comprising a tab washer positioned on said adjusting sleeve between said second adjusting washers and said at least one disc spring, said tab washer having at least one tab mated with said at least one keyway to minimize rotative motion and resulting wear between the disc spring and the tab washer.

19. The mounting structure according to claim 12, wherein said nut comprises a locknut having a nylon insert.

20. The mounting structure according to claim 12, wherein said first end of said pivot arm comprises a tapped hole, a threaded member threaded into said tapped hole with a free end of said threaded member extending outwardly from an outer side of said pivot arm, and a wheel nut adapted to be threaded onto said free end of said threaded member to secure a gauge wheel assembly to said pivot arm.

21. The mounting structure according to claim 20, further comprising a selected number of adjusting members positioned on said threaded member for adjusting a spacing between the gauge wheel assembly and the outer side of the pivot arm.

22. The mounting structure according to claim 21, wherein said adjusting members comprise washers and shims to adjust a lateral position of the gauge wheel assembly.

* * * * *